J. PARKER.
INDEXING CENTER.
APPLICATION FILED JUNE 10, 1915.
1,295,363.
Patented Feb. 25, 1919.
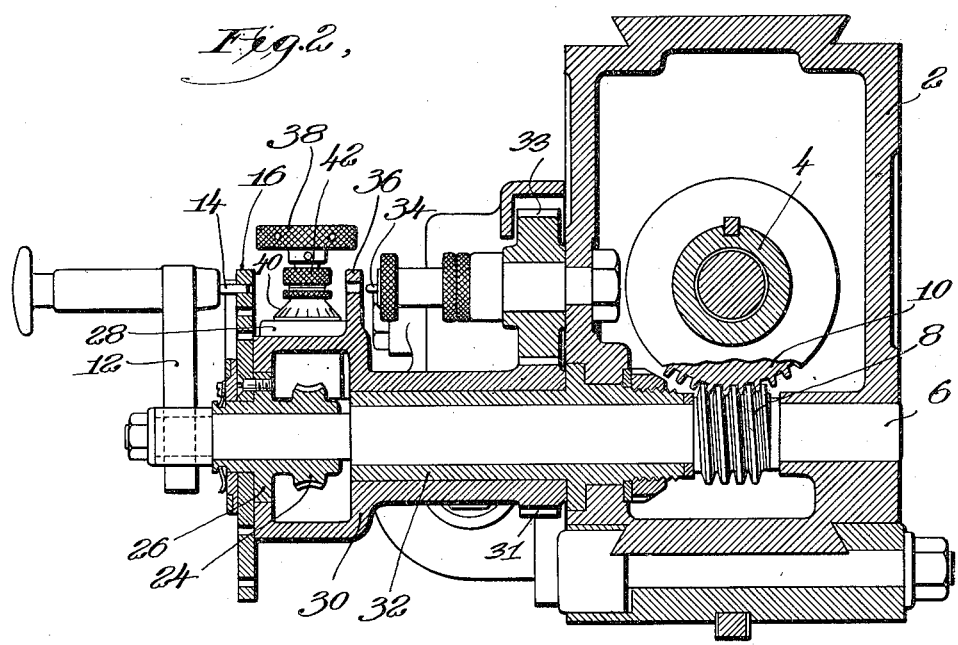
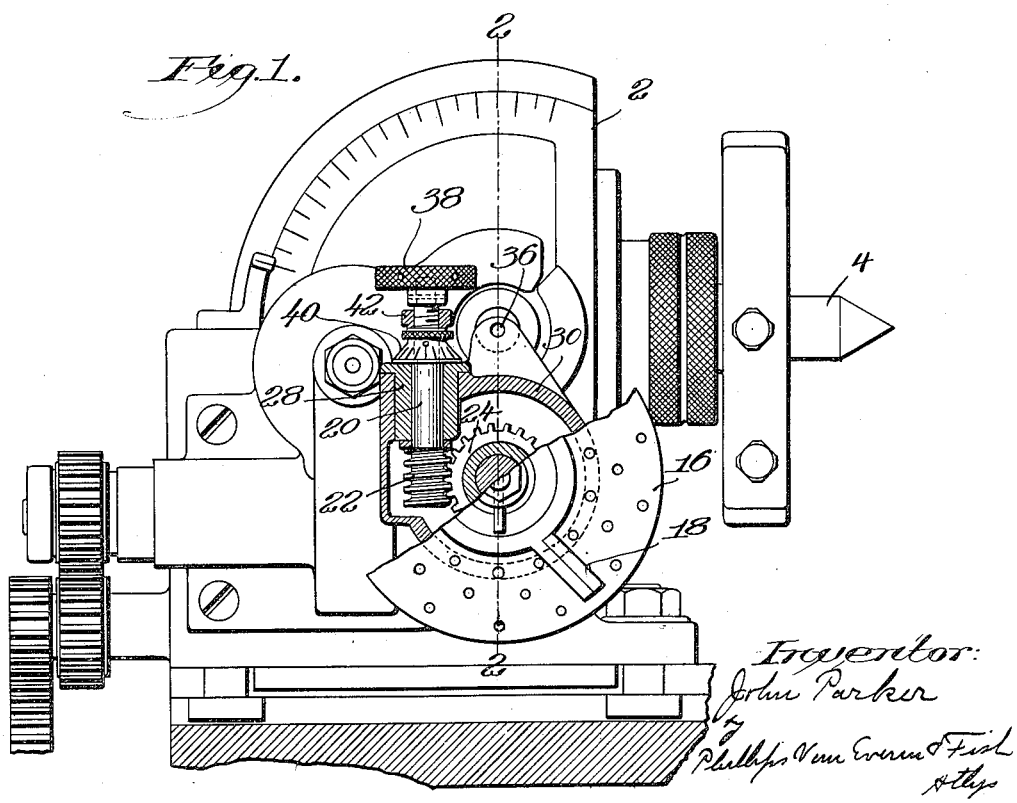
Inventor:
John Parker
by
Phillips Van Everen & Fish
Attys

UNITED STATES PATENT OFFICE.

JOHN PARKER, OF CRANSTON, RHODE ISLAND, ASSIGNOR TO BROWN AND SHARPE MANUFACTURING COMPANY, OF PROVIDENCE, RHODE ISLAND, A CORPORATION OF RHODE ISLAND.

INDEXING-CENTER.

1,295,363.  Specification of Letters Patent.  Patented Feb. 25, 1919.

Application filed June 10, 1915. Serial No. 33,370.

*To all whom it may concern:*

Be it known that I, JOHN PARKER, a subject of the King of Great Britain, residing at Cranston, in the county of Providence and State of Rhode Island, have invented certain new and useful Improvements in Indexing-Centers; and I do hereby declare the following to be a full, clear, and exact description of the invention, such as will enable others skilled in the art to which it appertains to make and use the same.

The invention relates to index centers such as are used upon milling and analogous machines for supporting and indexing the work.

The object of the invention is to provide novel and improved indexing mechanism which will not only enable the usual adjustments and divisions to be quickly and conveniently made in the usual manner, but will also enable fine and unusual adjustments, which are not within the range of the usual indexing devices, to be quickly and accurately made whenever occasion requires.

To this end the invention contemplates the provision in an indexing center provided with the usual index plate and pin for effecting the indexings and settings generally required, of a supplemental indexing mechanism for making the finer adjustments or settings which may occasionally be required. The supplemental indexing mechanism does not affect the operation of the main indexing mechanism by which the usual settings may be rapidly and conveniently made. In case an indexing or setting not within the range of the main indexing mechanism is required, however, an approximate indexing may be made by the main mechanism, and then the supplemental mechanism be operated to complete the indexing, or if the movement of the spindle requisite to secure the desired setting or indexing is slight, it may be secured by the supplemental mechanism alone. In addition to the features above indicated, the invention also includes certain further features of construction and combinations of parts hereinafter described and referred to in the claims.

The invention will be readily understood from an inspection of the accompanying drawings and the following detailed description of the indexing center illustrated therein.

In the drawings, Figure 1 is a side elevation of an index center adapted for either straight or spiral work and embodying the invention in its preferred form, and Fig. 2 is a sectional elevation on line 2—2, Fig. 1.

The invention is shown in the drawings as embodied in a universal index center adapted for either straight or spiral work. This center is provided with the usual head 2 in which the work or center supporting spindle 4 is mounted. The spindle is indexed by turning the index shaft 6 which is connected with the spindle by the worm 8 and worm wheel 10. The shaft is turned by means of an arm 12 which extends through a slot in the outer end of the shaft, and is provided at its outer end with an index pin 14 adapted to engage the holes in the index plate 16. The plate is provided with a number of circular series of holes, and the arm is free to slide through the index shaft to bring the pin into register with any series. When the spindle is to be indexed the pin 14 is withdrawn from the plate 16, the index shaft is turned through the proper angular distance, and then the index pin is engaged with the proper hole in the index plate. The index plate is provided with the usual sector arms 18 for indicating the hole into which the index pin should be inserted after the indexing has been performed.

The indexing mechanism thus far described is the main or usual indexing mechanism which is utilized to secure the indexings and settings usually required in regular practice. In embodying the present invention in an index center having the construction of main indexing mechanism above described, a supplemental indexing mechanism is provided through which the index shaft 6 may be turned without disturbing the relative positions of the index plate 16 and index pin 14 to secure indexings or fine adjustments which are not within the range of the main indexing mechanism. As shown, this supplemental indexing mechanism comprises a shaft 20 provided with a worm 22 engaging a worm wheel 24 which is loosely mounted on the index shaft 6 and is provided with a flange 26 to which the index plate 16 is secured. The shaft 20 is mounted in an eccentric bushing 28 which is in turn mounted in a boss formed on a sleeve 30. The sleeve 30 is mounted on the projecting bearing 32 for the shaft 6, and is held in fixed position in doing straight work by a pin 34 which engages a hole 36 formed in a projection on the sleeve. In doing spiral work the pin 34 is withdrawn from the hole 36, and the sleeve 30 is turned during the cutting, through gearing 31, 33 which connects the sleeve with the screw or other feed mechanism of the table on which the center is mounted. The uppper end of the worm shaft 20 is provided with a knurled head 38 by which the shaft may be turned in indexing or setting the spindle. The shaft is also provided with a graduated dial 40 to indicate the movement imparted to the spindle by rotation of the shaft.

Assuming that the worm 8 and worm wheel 10 are so proportioned that one revolution of the index shaft 6 turns the spindle 4 through 9°, which is the ratio used in the center illustrated, then the worm 22 and worm wheel 24 of the supplemental indexing mechanism may be conveniently so proportioned that one revolution of the shaft 20 will turn the spindle through ¼° or 15′. There may then conveniently be 30 divisions on the dial 40, so that the divisions will indicate the distance through which the shaft 20 should be turned to turn the spindle through ½′. The spindle may therefore be quickly and accurately turned to space the work through any number of degrees and minutes or half minutes, by utilizing the main indexing mechanism to turn the work to the nearest reading within the range of this mechanism, and then turning the supplemental index shaft through the required minutes or half minutes requisite to secure the desired setting. When the desired setting is within the range of the main indexing mechanism, the index plate 16 is locked in fixed position with relation to the sleeve 30 by the worm and worm wheel of the supplemental indexing mechanism, so that the main mechanism may be operated in the usual manner to rapidly and accurately index or set the spindle. The dial 40 is adjustably secured upon the shaft 20 by a nut 42 which serves to clamp the dial against the shoulder on the shaft. When the nut is loosened the dial may be adjusted on the shaft to bring the zero mark on the dial into register with the coöperating mark on the end of the bushing 28. This enables the indicating devices of the supplemental index mechanism to be brought into zero position in setting up work, or whenever for any reason it is desired to bring it into this position, without imparting movement to the spindle or to the index plate.

The supplemental indexing mechanism also provides a convenient means for relatively adjusting the index pin and plate to bring the pin and a hole in the plate into register in positioning work in exact relation to the cutter, or in bringing partially completed work into proper relation to the cutter. It may also be utilized to effect a fine adjustment of the work with relation to the cutter.

While the invention has been shown as embodied in an index center adapted for spiral work, it will be understood that it may be embodied with equal advantage in machines which are adapted for doing only straight work, and it will also be understood that the specific construction and arrangement of the parts is not essential to the broader features of the invention, but may be varied or modified as found desirable or best suited to the construction of index center in which the invention is to be embodied.

Having explained the nature and object of the invention, and specifically described one form of mechanism in which it may be embodied, what is claimed is:—

1. An index center, having, in combination, a work or center supporting spindle, main index mechanism comprising an index plate provided with circular series of holes and an index pin adapted to be brought into register with any series, one of said parts being connected to turn the spindle, and a supplemental index mechanism constructed to turn the spindle to supplement the settings of the main mechanism and graduated to indicate settings not within the range of the main mechanism.

2. An index center, having, in combination, a work or center supporting spindle, an index shaft connected to turn the spindle and provided with a radially movable index pin arm, an index plate provided with circular series of holes to be engaged by the index pin on the arm, a worm wheel mounted concentrically with the shaft to which the index plate is secured, a supplemental index shaft provided with a worm engaging the worm wheel to turn the plate, radial arm and spindle and provided with indicating means graduated to indicate fine settings not within the range of the index plate and arm.

3. An index center, having, in combination, a work or center supporting spindle, an index shaft connected to turn the spindle, a main index mechanism comprising an index plate provided with circular series of holes and an index arm carrying a pin adapted to be brought into register with any series, a worm wheel mounted concentric with the index shaft to which the index plate is secured, a supplemental index shaft provided with a worm engaging the worm wheel and with indicating means for indicating settings not within the range of the main index mechanism, a sleeve in which the supplemental index shaft is mounted, and means for either holding the sleeve stationary or for connecting it with the feed mechanism of the table upon which the center is mounted.

4. An index center, having, in combination, a work or center supporting spindle, main index mechanism therefor, a supplemental index mechanism for making adjustments not within the range of the main index mechanism, and indicating means for the supplemental mechanism adjustable to bring it to zero position without movement of the spindle.

5. An index center, having, in combination, a work or center supporting spindle, an index shaft connected to turn the spindle and provided with a radially movable index pin arm, an index plate provided with circular series of holes to be engaged by the index pin on the arm, a worm wheel mounted concentrically with the shaft to which the index plate is secured, and a supplemental index shaft provided with a worm engaging the worm wheel and with a graduated dial for indicating the movement imparted to the spindle circumferentially adjustable about the supplemental index shaft.

6. An index center, having, in combination, a work or center supporting spindle, a main indexing mechanism therefor for effecting the usual indexing and setting of the spindle, and a supplemental indexing mechanism connected to turn the main indexing mechanism to effect fine adjustments and settings not within the range of the main indexing mechanism.

7. An index center, having, in combination, a work or center supporting spindle, an index shaft connected to turn the spindle, an index pin connected to the shaft, a worm wheel mounted concentrically with the shaft, an index plate secured to the worm wheel, a supplemental index shaft provided with a worm engaging the worm wheel and with indicating means graduated to indicate fine settings not within the range of the index plate and pin.

8. An index center, having, in combination, a work or center supporting spindle, main indexing mechanism comprising an index plate provided with circular series of holes and an index pin adapted to be brought into register with any series, one of said parts being connected to turn the spindle, and a supplemental index mechanism connected to turn said parts and graduated to indicate settings not within their range.

9. An index center, having, in combination, a work or center supporting spindle, main indexing mechanism comprising an index plate provided with circular series of holes and an index pin adapted to be brought into register with any series, one of said parts being connected to turn the spindle, a supplemental index mechanism connected to turn said parts and graduated to indicate settings not within their range, a rotary support for the supplemental index mechanism, and means for either holding said support stationary or connecting it with the feed mechanism of the table upon which the center is mounted.

JOHN PARKER.